United States Patent Office 3,332,786
Patented July 25, 1967

3,332,786
METHOD OF PREPARING ENZYME STABLE STARCH AND PRODUCT
Ray L. Edlin, San Diego, Calif., assignor to Kelco Company, San Diego, Calif., a corporation of Delaware
No Drawing. Filed June 13, 1966, Ser. No. 556,903
14 Claims. (Cl. 99—139)

This invention relates to the stabilization of starch against enzymatic degradation. More particularly, the invention relates to the stabilization of starch by the addition thereto of propylene glycol alginate.

The enzymatic degradation of starch, particularly by amylase enzymes, has long been a problem. Previous attempts to stabilize starch against enzymatic degradation have not been successful.

Starch is commonly employed in thickening various foods. To cite but a few, starch is commonly employed as a thickener in the preparation of baby foods and summer fillings such as a custard type pie filling or a custard type dessert. Frequently, in the consumption of such a food, it will come in contact with a source of an amylase enzyme. To illustrate, in feeding a baby from a container of baby food, the spoon used in feeding the baby will frequently be dipped into the food container. Amylase enzymes are commonly present in saliva and thus are transferred to the contents of the container on the spoon. The effect of amylase enzymes on starch is a dramatic one. In the case of baby food, the transfer of amylase enzymes to the food can reduce its thickness to slightly more than that of water in thirty minutes or less. The body of the baby food is then essentially destroyed and it is no longer desirable for consumption.

An object of my invention is to provide a method for stabilizing starch which greatly improves its stability to degradation by amylase enzymes.

A further object of my invention is to provide a method of stabilizing starch against degradation by amylase enzymes by the addition to the starch of propylene glycol alginate.

Additional objects will become apparent from a reading of the specification and claims which follow.

In the practice of my invention, I have found that the presence of propylene glycol alginate in admixture with starch stabilizes the starch against degradation by amylase enzymes in an aqueous acid environment. The quantity of starch present can, for example, range from about 0.5 to about 8.0% by weight and the quantity of propylene glycol alginate present can range from about 0.1 to about 2.0% by weight.

I have found that the presence of propylene glycol alginate with starch, particularly in the relative proportions specified above, reduces degradation of the starch by amylase enzymes within the pH range from about 3.0 to about 4.5. However, I have found that my method of stabilizing starch works best within the pH range from 3 to 4.

Propylene glycol alginate is described in U.S. Patent 2,426,125 entitled "Manufacture of Glycol Alginates." It has been available as a product of commerce for some time and is obtainable in a variety of forms, all of which are suitable in practicing the method of the present invention.

In addition to the propylene glycol alginate and starch in the aqueous medium, other ingredients may also be present. To illustrate, the aqueous medium can contain milk, orange juice, vegetables, fruits, flavoring agents, and the like. In fact, in the use of my invention in the stabilization of starch in a food product, the product may contain essentially any food ingredient so long as it contains water in some form, e.g., milk, fruit juices, etc., and has a pH within the ranges specified above. Any such food product may be improved by the method of my invention through the addition thereto of propylene glycol alginate to stabilize the starch and greatly increase its resistance to degradation by amylase enzymes.

I have found that all starches may be stabilized according to the method of my invention. To illustrate but a few, I have found that natural or modified starches derived from corn, wheat, potatoes, waxy maize and tapioca are all improved. In addition, pregelatinized starches are also improved by my invention.

To further illustrate my invention, there are presented the following examples in which all parts and percentages are by weight unless otherwise illustrated.

*Example I*

Samples were prepared by dry mixing a modified waxy maize starch with a propylene glycol alginate and adding the mixture to water with good agitation. The water employed in preparing the samples was a 50–50 volume blend of tap water and distilled water. After stirring until the sample was substantially homogenous, it was cooled in a tap water bath and stirred still further to insure homogeneity. The sample was then heated to 95° C. and held at this temperature for about 20 minutes to insure gelatinization of the starch. Following this, the sample was cooled to 24° C. using a tap water bath. The initial viscosity of the sample was then recorded with a model LVF Brookfield Viscometer. The samples were then inoculated with 1 milliliter of a diastase solution containing 0.007 gram of amylase in 1 milliliter of distilled water. The diastase solution was mixed into the samples by using a spatula. The viscosity was then measured at various time intervals of 2, 4, 8, 16 and 32 minutes after inoculation with the enzyme. Following a 24-hour period, the viscosity of the sample was again measured using a Brookfield Viscometer.

The results of these tests are set forth in the following Table I. The weight percent of modified waxy maize starch (Clearjel—National Starch & Chemical Corp.) is set forth in Table I and the quantity of propylene glycol alginate is set forth in Table II. Also set forth in Table II is a designation of the particular propylene glycol alginate as Kelcoloid followed by a number. The number indicates a particular grade of propylene glycol alginate sold by the Kelco Company of San Diego, Calif., under the trade mark "Kelcoloid." The total quantity of each sample was 100 grams and thus the weight percent of starch and propylene glycol alginate set forth in columns 1 and 2 indicate the weight of each material in grams in the 100 gram sample. The initial viscosity of the sample (prior to inoculation with the diastase solution) is set forth in the next column followed by the viscosities of the samples at various time intervals after inoculation in the succeeding columns. The pH of the samples is set forth in the last column.

TABLE I

| Sample | Starch, weight percent | Propylene glycol alginate, weight percent | Brookfield viscosity, cps. (Minutes) | | | | | | Brookfield viscosity, cps. (Hours) | | pH of sample |
|---|---|---|---|---|---|---|---|---|---|---|---|
| | | | 0 | 2 | 4 | 8 | 16 | 32 | 24 | 48 | |
| | 3.75 | 0.3 Kelcoloid KDHVF | 831 | 775 | 774 | 777 | 807 | 850 | 1,973 | 2,670 | 4.26 |
| | 3.5 | 0.3 Kelcoloid KDHVF | 712 | 610 | 604 | 604 | 664 | 750 | 1,180 | | 4.13 |
| | 2.8 | 0.6 Kelcoloid KDHVF | 478 | 407 | 388 | 415 | 417 | 421 | 1,095 | 957 | 3.97 |
| | 2.2 | 0.8 Kelcoloid KDHVF | 335 | 287 | 289 | 295 | 305 | 328 | 804 | 700 | 3.76 |
| | 1.6 | 1.0 Kelcoloid KDHVF | 326 | 250 | 261 | 265 | 280 | 305 | 640 | 765 | 3.71 |
| | 1.2 | 1.2 Kelcoloid KDHVF | 343 | 251 | 252 | 262 | 268 | 296 | 640 | 722 | 3.64 |
| | 1.0 | 1.3 Kelcoloid KDHVF | 442 | 362 | 368 | 378 | 393 | 426 | 851 | 817 | 3.63 |
| | 3.75 | 0.3 Kelcoloid KDLVF | 446 | 340 | 343 | 344 | 335 | 349 | 390 | | 4.12 |
| 0 | 2.8 | 0.6 Kelcoloid KDLVF | 237 | 193 | 195 | 192 | 181 | 163 | 232 | | 4.10 |
| 1 | 2.2 | 0.8 Kelcoloid KDLVF | 96 | 97 | 97 | 100 | 88 | 102 | 180 | | 3.77 |
| 2 | 1.6 | 1.0 Kelcoloid KDLVF | 109 | 107 | 108 | 111 | 106 | 113 | 178 | | 3.75 |
| 3 | 1.2 | 1.2 Kelcoloid KDLVF | 81 | 97 | 98 | 101 | 124 | 130 | 288 | | 3.70 |
| 4 | 1.0 | 1.3 Kelcoloid KDLVF | 143 | 136 | 135 | 138 | 137 | 140 | 297 | | 3.66 |
| 5 | 2.8 | 0.6 Kelcoloid KDL | 83 | 84 | 84 | 87 | 87 | 84 | 68 | | 4.40 |
| 6 | 2.2 | 0.8 Kelcoloid KDL | 67 | 72 | 72 | 73 | 75 | 75 | 67 | | 4.35 |
| 7 | 1.6 | 1.0 Kelcoloid KDL | 75 | 73 | 73 | 72 | 71 | 72 | 66 | | 4.33 |
| 8 | 1.2 | 1.2 Kelcoloid KDL | 63 | 68 | 67 | 68 | 68 | 65 | 67 | | 4.29 |
| 9 | 1.0 | 1.3 Kelcoloid KDL | 45 | 60 | 60 | 62 | 54 | 70 | 53 | | 4.25 |
| | 2.8 | 0.6 Kelcoloid KDO | 80 | 73 | 71 | 64 | 51 | 65 | 48 | | 4.05 |
| | 2.2 | 0.8 Kelcoloid KDO | 51 | 50 | 52 | 51 | 51 | 48 | 55 | | 4.00 |
| | 1.6 | 1.0 Kelcoloid KDO | 45 | 47 | 48 | 48 | 47 | 50 | 56 | | 3.95 |
| | 1.2 | 1.2 Kelcoloid KDO | 47 | 53 | 53 | 53 | 53 | 54 | 56 | | 3.13 |
| | 1.0 | 1.3 Kelcoloid KDO | 51 | 55 | 55 | 55 | 54 | 55 | 55 | | 4.16 |

As shown in the foregoing table, all of the various grades of propylene glycol alginate in varying amounts with respect to the starch present, were successful in stabilizing the starch against enzymatic degradation. The initial viscosity of the sample was affected by the grade of propylene glycol alginate which was employed. For example, the Kelcoloid KDHVF grade, which is a high viscosity propylene glycol alginate, gave a higher sample viscosity than the other grades of propylene glycol alginate. However, the change in the viscosity of the various samples with time did not vary appreciably from one grade of propylene glycol alginate to the next. All were effective in stabilizing enzymatic degradation of the starch and thereby maintaining the viscosity of the sample.

The increase in viscosity noted in some of the examples is not entirely understood. It is believed that it may be due to some cross linking of the algin molecules and/or reaction of the algin with starch in some as yet unknown manner. In any event, the increase in viscosity is not a result of enzymatic degradation of the starch which produces just the opposite result—a sharp decrease in the viscosity of the sample.

In order to make certain that the observed stabilization is not merely the result of some enzymatic decomposition of the propylene glycol alginate, several additional experiments were performed. In these experiments, 1% by weight aqueous solutions of various grades of propylene glycol alginate were inoculated with 1 milliliter of a diastase solution containing 0.007 gram of amylase in distilled water. The initial viscosity of the propylene glycol alginate solution was determined and the viscosity was again determined after 24 hours to determine whether there had been any change due to inoculation with the enzyme. One hundred grams of a 1% propylene glycol alginate (Kelcoloid KDHVF) had an initial viscosity of 900 cps. as measured with a Brookfield Viscometer. The pH of the system was controlled by the addition of 0.1 M acetic acid to a pH of 3.52. After inoculation with 1 milliliter of the diastase solution, the viscosity of the system was again measured after 24 hours and found to be 2370 cps. The test was repeated using 100 grams of 1% solution of propylene glycol alginate (Kelcoloid KDLVF) at a pH of 3.47. The initial viscosity was found to be 316 cps. and the viscosity 24 hours after inoculation with 1 milliliter of the diastase solution was 374 cps. These tests clearly show that propylene glycol alginate is not affected by amylase enzymes and that the effect of propylene glycol alginate in stabilizing the enzymatic degradation of the starch is not due to an enzymatic reaction with the propylene glycol alginate.

*Example II*

In a further series of tests, conducted in the same manner as those set forth in Example I and Table I, samples were made up which contained a modified waxy maize starch in combination with varying amounts of propylene glycol. The initial viscosity of the sample was determined using a Brookfield Viscometer and 1 milliliter of a diastase solution containing 0.007 gram of amylase in distilled water was then used to inoculate the samples. Following inoculation, the Brookfield viscosity of the samples were determined at 2, 4, 8, 16 and 32 minutes and later at 24 hours. The pH of the various samples was controlled by the addition thereto of 0.1 M acetic acid.

The results of the tests are shown in the following Table II. In each test, a 100 gram sample was used. The weight percent of modified waxy maize starch (Clearjel) is set forth in column 2 and the weight percent of propylene glycol is set forth in column 3. The Brookfield viscosity at various time intervals is set forth in the succeeding columns and in the last column is set forth the pH of the sample.

TABLE II
(Part 1)

| Sample | Starch, weight percent | Propylene glycol, weight percent |
|---|---|---|
| 24 | 5 | 1 |
| 25 | 5 | 1 |
| 26 | 5 | 1 |
| 27 | 5 | 1 |

(Part 2)

| Sample | Brookfield viscosity, cps. (Minutes) | | | | | | Brookfield viscosity, cps. (Hours) | pH of sample |
|---|---|---|---|---|---|---|---|---|
| | 0 | 2 | 4 | 8 | 16 | 32 | 24 | |
| 24 | 526 | 740 | 860 | 934 | 524 | 21 | 7 | 3.50 |
| 25 | 730 | 1,070 | 1,150 | 770 | 51 | 8 | 7 | 4.00 |
| 26 | 840 | 1,240 | 1,260 | 912 | 140 | 16 | 7 | 4.50 |
| 27 | 570 | 980 | 1,010 | 664 | 40 | 9 | 7 | 4.00 |

As shown in the above table, the presence of propylene glycol per se had no discernible effect in stabilizing the starch against enzymatic degradation. Although the viscosity of the individual samples varied somewhat initially, all had degraded to the low viscosity of 7 cps. after a time period of 24 hours following inoculation with the amylase enzyme.

Example III

A number of tests were performed to determine the effect of pH on the enzymatic degradation of starch. In these tests, a sample containing 95 grams of water and 5 grams of a modified waxy maize starch (Clearjel) was cooked as described previously and the pH was then adjusted by the addition of an acid. The initial Brookfield viscosity was determined and the sample was then inoculated with 1 milliliter of an aqueous distaste solution containing 0.007 gram of amylase enzyme in distilled water. The viscosity was then determined at prescribed time intervals following inoculation. Results of the tests are set forth in the following Table III.

TABLE III

| Sample, 100 grams of 5% starch solution | Brookfield viscosity, cps. | | | | | | | pH of sample and acid employed to adjust pH |
|---|---|---|---|---|---|---|---|---|
| | (Minutes) | | | | | (Hours) | | |
| | 0 | 2 | 4 | 8 | 16 | 32 | 24 | |
| 28 | 970 | 1,374 | 1,128 | 340 | 18 | 6 | 8 | 4.10 (0.1 N HCl). |
| 29 | 1,216 | 1,500 | 1,120 | 616 | 257 | 16 | 9 | 3.50 (0.1 N HCl). |
| 30 | 1,240 | 980 | 680 | 292 | 28 | 10 | 7 | 3.95 (Citric acid). |
| 31 | 1,190 | 1,306 | 1,346 | 1,234 | 614 | 107 | 7 | 3.35 (Citric acid). |
| 32 | 774 | 810 | 908 | 1,044 | 1,040 | 460 | 16 | 3.40 (0.1 M acetic acid). |

As shown in the above table, all of the starch samples were enzymatically degraded within a 24 hour period when the starch samples had a pH within the general range of 3 to 4. Certain samples degraded more rapidly than others. The important thing, however, is that all were degraded to a thickness only slightly above that of water in a 24 hour period.

Example IV

In a still further series of tests, the starch was prepared by cooking in a water bath at a temperature of about 190° F. for 30 minutes. Following this, the propylgene glycol alginate was added and the sample was cooled to a temperature of about 24° C. and its viscosity was determined with a Brookfield Viscometer, Model LVF. Each of the 100 gram samples was then inoculated with 1 milliliter of a disastase solution containing 0.007 gram of amylase enzyme in distilled water. The viscosity of the various samples were then determined 24 hours after the addition of the amylase enzyme. The pH of all of the test samples varied between about 3.4 and about 3.6. The results of these tests are set forth in the following Table IV.

TABLE IV

| Sample | Starch, weight percent | Propylene glycol alginate, weight percent | Viscosity, cps. | |
|---|---|---|---|---|
| | | | Initial | 24 hours |
| 33 | 3.75 | 0.3 Kelcoloid KDHVF | 2,720 | 4,300 |
| 34 | 2.8 | 0.6 Kelcoloid KDHVF | 4,570 | 6,900 |
| 35 | 3.25 | 0.45 Kelcoloid KDHVF | 6,760 | 7,670 |
| 36 | 2.8 | 0.6 Kelcoloid KDHVF | 5,660 | 7,540 |

The results of Table IV show that propylene glycol alginate is effective in stabilizing starch according to the method of the invention when the alginate is added to the starch after it has been suitably cooked. A comparison of the results in Table IV with those of Table I shows that there is no appreciable difference in result between adding the propylene glycol alginate prior to cooking or adding it subsequent to cooking of the starch. In either case, the propylene glycol alginate stabilizes the starch against enzymatic degradation.

In other tests which were performed, calcium gluconate, magnesium phosphate, sodium hexametaphosphate and the sodium salt of ethylene diamine tetraacetic acid (Versenate) were added to a mixture of a modified waxy maize starch in combination with propylene glycol alginate (Kelcoloid KDHVF) in which the starch had been cooked in the manner of Example I. It was found that the initial viscosity of the sample was increased appreciably when calcium was added. The addition of phosphates was found to reduce the initial viscosity and the use of magnesium also was found to give a lower initial viscosity. None of these materials, however, was found to interfere with the protective action of propylene glycol alginate in stabilizing the starch against enzymatic degradation within the general pH range of 3 to 4.

Example V

A still further series of tests was performed to determine the effectiveness of propylene glycol alginate in stabilizing various starches. In each of these tests, the propylene glycol alginate and starch were mixed dry and added to water with stirring, after which the mixture was heated to 95° C. as in Example I, held at this temperature for 20 minutes, cooled to 24° C., and the Brookfield viscosity determined in centipoises. The samples were then inoculated with either 1 milliliter of disastase solution (0.007 gram of amylase per millilite of distilled water) or with 1 milliliter of saliva. The Brookfield viscosities were then determined at various time intervals after inoculation. The results are set forth in the following Table V. Each of the samples weighed 100 grams, and the pH was controlled by the addition of 0.1 M acetic acid.

The data presented in Table V clearly demonstration that propylene glycol alginate is effective in stabilizing variety of starches. The modified tapioca starch which was tested is sold under the trade name Purity D; the pregelatinized modified waxy maize starch is sold under the trade name Instant Clearjel; and the modified wheat starch is sold under the trade name Paygel. As might be expected, the pregelatinized starch gave much higher sample viscosities than the other starches. However, the no change of the sample viscosities after inoculation showed that all of the starches were stabilized against enzymatic degradation by the presence of the propylene glycol alignate.

TABLE V
(Part 1)

| Sample | Starch, weight percent | Propylene glycol alginate, weight percent | Enzyme |
|---|---|---|---|
| 7 | 5 Raw Corn Starch | 1 Kelcoloid KDHVF | Amylase. |
| 8 | do | do | Saliva. |
| 9 | 5 Modified Tapioca Starch | do | Amylase. |
| 10 | do | do | Saliva. |
| 11 | 5 Pregelatinized Modified Waxy Maize Starch. | do | Amylase. |
| 12 | do | do | Saliva. |
| 13 | 5 Modified Wheat Starch | do | Amylase. |
| 14 | do | do | Saliva. |

(Part 2)

| Sample | Brookfield viscosity, cps. | | | | | | | pH of sample |
|---|---|---|---|---|---|---|---|---|
| | (Minutes) | | | | | | (Hours) | |
| | 0 | 2 | 4 | 8 | 16 | 32 | 24 | |
| 7 | 7,860 | 7,525 | 6,715 | 7,075 | 6,290 | 6,335 | 10,670 | 3.30 |
| 8 | 6,750 | 6,500 | 6,900 | 7,200 | 6,030 | 5,718 | 7,820 | 3.42 |
| 9 | 5,490 | 5,995 | 4,925 | 4,915 | 4,795 | 4,950 | 6,014 | 3.30 |
| 10 | 5,670 | 6,250 | 4,150 | 4,125 | 4,100 | 4,100 | 5,200 | 3.34 |
| 11 | 47,350 | 38,200 | 34,725 | 32,450 | 24,900 | 18,125 | 43,100 | 3.85 |
| 12 | 48,400 | 38,900 | 36,800 | 36,140 | 17,900 | 17,300 | 42,000 | 3.89 |
| 13 | 8,475 | 8,320 | 8,385 | 8,265 | 8,335 | 8,640 | 13,650 | 3.32 |
| 14 | 8,900 | 8,330 | 8,450 | 8,370 | 8,670 | 8,900 | 13,800 | 3.32 |

Example VI 100 gram sample was prepared by the addition of 6 grams of a modified waxy maize starch (Clearjel) and 1 gram of propylene glycol alginate (Kelcoloid KDHVF) to 93 grams of water. The ingredients were first mixed dry and then added to the water with stirring, after which the mixture was heated to about 95° C., held at this temperature for about 20 minutes and then cooled to about 4° C. This sample was stored at this temperature for 24 hours and its viscosity was then determined with a Brookfield Viscometer and found to be 86,500 cps. The sample was then inoculated with 1 milliliter of a diastase solution containing 0.007 gram of amylase in distilled water. The viscosity of the sample was determined 24 hours after inoculation and found to be 98,000 cps. The pH of the sample was 3.53.

The results of Example VI show that the stabilization of starch by the presence therewith of propylene glycol alginate does not change appreciably with the passage of time. Thus, even after being stored for 24 hours prior to inoculation with enzymes, the starch was suitably stabilized against enzymatic deterioration.

Example VII

The procedure employed in Example VI was repeated using a 100 gram sample prepared by the addition of 6 grams of a modified waxy maize starch (Clearjel) and 1 gram of propylene glycol alginate (Kelcoloid KDLVF) to 93 grams of water. The pH of the sample was 3.55. After storage for 24 hours at about 24° C., the Brookfield viscosity of the sample was 42,000 cps. The Brookfield viscosity 24 hours after inoculation with 1 milliliter of a diastase solution containing 0.007 gram of amylase in distilled water was 42,600 cps.

The results of Example VII further confirm Example VI in showing that stabilization of starch by the addition thereto of propylene glycol alginate is not affected appreciably by the passage of time. The lower sample viscosity observed in Example VII resulted from the use of lower viscosity grade of propylene glycol alginate. Both Examples VI and VII, however, there was no loss in viscosity after inoculation with the diastase solution.

To demonstrate the utility of my invention in stabilizing a food product against enzymatic degradation, starch-containing orange pudding baby foods were prepared both with and without the addition of propylene glycol alginate. It was found that the baby food containing propylene glycol alginate in combination with starch was protected against enzymatic degradation whereas the control product which contained no propylene glycol alginate was enzymatically degraded. The results of these tests are shown in the following example.

Example VIII

An orange pudding baby food was prepared by dry blending 6 parts of a modified waxy maize starch (Clearjel), 3 parts of sugar, 0.5 part of salt, and 2.0 parts of non-fat dry milk solids, which were then added with agitation to 83.5 parts of water and 4 parts of orange juice. The mixture was then heated to 180° F. and held at this temperature for 15 minutes. It was then heated to 220° F. and allowed to cool and set for 24 hours. The pH of the orange pudding was 3.8, the total weight of pudding was 100 grams, and the Brookfield viscosity after setting for 24 hours was 3000 cps. The sample was then inoculated with 0.5 milliliter of salvia and allowed to set for an additional 24 hours. At this point the Brookfield viscosity was measured and found to be 21 cps.

A further orange pudding baby food was prepared by dry blending 0.4 part of propylene glycol alginate (Kelcoloid KDHVF), 3 parts of sugar, and 4 parts of a modified waxy maize starch (Clearjel). The ingredients were then added to 4 parts of orange juice in admixture with a much larger quantity of water. The mixture was then heated to 180° F. at which point an aqueous slurry containing 2 parts of non-fat milk solids, 0.5 part of salt, and 0.08 part of dicalcium phosphate dihydrate were added. The total quantity of water contained in the mixture including that added with the slurry was 86.1 parts. The mixture was then heated for 15 minutes at 180° F. and heated further to 220° F. after which it was allowed to cool and set for 24 hours. The pH of the resulting orange pudding was 3.9, the total weight of pudding was 100 grams, and the viscosity after setting for 24 hours was 3100 cps. The sample was then inoculated with 0.5 milliliter of saliva and allowed to set for an additional 24 hours at which point the viscosity was again measured and found to be 3210 cps.

The results set forth in Example VIII demonstrate the effectiveness of propylene glycol alginate in stabilizing the starch present in the orange pudding baby food against enzymatic degradation. In the sample which contained no propylene glycol alginate, enzymatic degradation was clearly evidenced by the great reduction in the viscosity 24 hours after inoculation with saliva. In contrast, the sample containing propylene glycol alginate showed no evidence of enzymatic degradation after a 24 hour period.

As shown by the foregoing examples, my invention provides an effective means for stabilizing a wide variety of starches against enzymatic degradation within the general pH range from about 3.0 to 4.5. Stabilization of the starch by the propylene glycol alginate is not affected by the addition of other ingredients as commonly found in various food products and any of the various grades of propylene glycol alginate may be employed.

In the foregoing examples, various references have been made to specific concentrations of ingredients, temperatures, heating times, and the like. It should be understood that these references are solely for purposes of illustration and are not intended to limit the scope of my invention. I desired that my invention be limited only by the lawful scope of the appended claims.

I claim:

1. A method of stabilizing a gelatinized starch to enzymatic degradation in an aqueous acid environment within the pH range from about 3 to about 4.5, the starch content of said aqueous environment ranging from about 0.5 to about 8% by weight, said method comprising adding to said environment from about 0.1 to about 2% by weight of propylene glycol alginate.

2. The method of claim 1 wherein the pH range is from about 3 to about 4.

3. The method of claim 1 wherein said starch is stabilized to degradation by amylase enzymes.

4. The method of claim 2 wherein said starch is a modified waxy maize starch.

5. The method of claim 2 wherein said starch is a modified tapioca starch.

6. The method of claim 2 wherein said starch is pregelatinized.

7. The method of claim 2 wherein said starch is a modified wheat starch.

8. A starch-containing food product having a pH from about 3.0 to about 4.5, said product containing water, from about 0.5 to about 8% of a gelatinized starch susceptible to enzymatic degradation, and from about 0.2 to about 2% by weight of propylene glycol alginate, said propylene glycol alginate being effective to stabilize said starch against enzymatic degradation.

9. The starch-containing food product of claim 8 wherein said food product has a pH in the range from about 3.0 to about 4.0.

10. The starch-containing food product of claim 9 wherein said starch is a modified waxy maize starch.

11. The starch-containing food product of claim 9 wherein said starch is a modified tapioca starch.

12. The starch-containing food product of claim 9 wherein said starch is pregelatinized.

13. The starch-containing food product of claim 9 wherein said starch is a modified wheat starch.

14. A method of stabilizing a gelatinized starch to enzymatic degradation in an aqueous acid environment within the pH range from about 3 to about 4.5, the starch content of said aqueous environment ranging from about 0.5 to about 8% by weight, said method comprising adding propylene glycol alginate to said environment in an effective amount to stabilize said gelatinized starch against enzymatic degradation.

References Cited

UNITED STATES PATENTS 3,257,214   6/1966   McDermott _____ 99—139 X

OTHER REFERENCES

"Kelco Algin," copyright Oct. 5, 1961, Kelco Co., Los Angeles, pp. 2, 5, 6 and 7.

A. LOUIS MONACELL, *Primary Examiner.*

RAYMOND N. JONES, *Examiner.*

J. M. HUNTER, *Assistant Examiner.*